April 24, 1945.   A. B. VIETH   2,374,513
NONSPILL VENT DEVICE
Filed Dec. 2, 1942
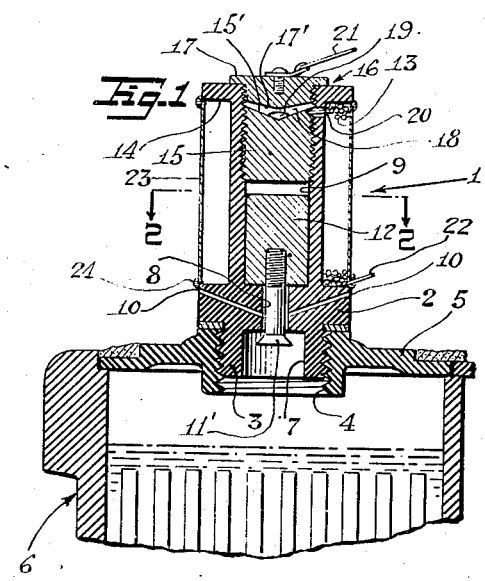
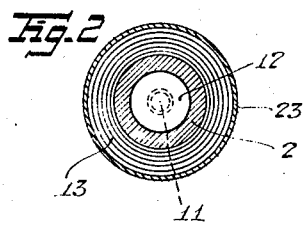
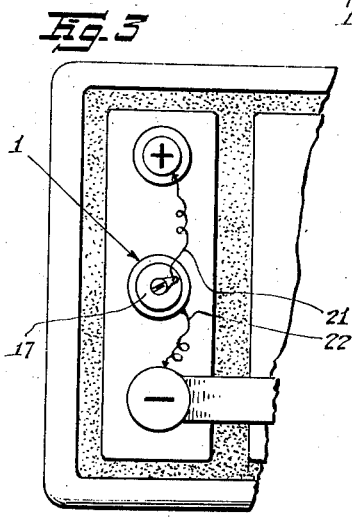
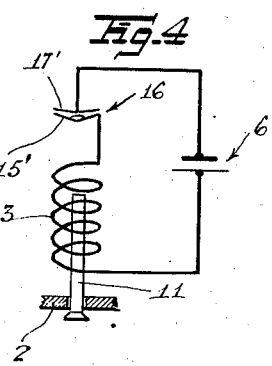
Inventor
Albert B. Vieth
By Henry Lanahan
Attorney Patented Apr. 24, 1945

2,374,513

UNITED STATES PATENT OFFICE 2,374,513

NONSPILL VENT DEVICE

Albert B. Vieth, Kearny, N. J., assignor to Thomas A. Edison, Incorporated, West Orange, N. J., a corporation of New Jersey Application December 2, 1942, Serial No. 467,588

5 Claims. (Cl. 137—139)

This invention relates to non-spill vent devices for liquid-containing vessels, and has particular relation to a non-spill vent device for a storage battery.

My invention is particularly concerned with an electrically actuated non-spill vent device such as may be energized by the battery which it serves, and has for an object to provide a novel non-spill vent device which is highly positive and dependable in its operation.

More especially, my invention has for its objects to provide an improved non-spill vent device which is operable automatically to closed condition when the device is tilted a small angle from a normal position, and which will positively maintain itself closed while the device is so tilted or inverted and subjected to high acceleration and de-acceleration.

It is another object to provide such a non-spill vent device which will positively return to open condition when the device is restored to a normal position.

Other and allied objects of my invention will more fully appear from the following description and the appended claims.

In the description of my invention reference is had to the accompanying drawing, of which:

Figure 1 is a vertical sectional view showing a vent plug for a storage battery cell according to my invention;

Figure 2 is a horizontal sectional view taken substantially on the line 2—2 of Figure 1;

Figure 3 is a top plan view of the structure of Figure 1; and

Figure 4 is a diagrammatic view illustrating the operation of my vent plug.

While I herein show my invention in connection with a removable vent plug or cap for the filler opening of a storage battery cell, it is to be understood that I intend no unnecessary restriction of my invention to such plug or cap, for I may apply my invention to any cover portion, fixed or removable, of the vessel to be vented. When my invention is applied to a fixed or permanent part of the cover of the vessel, it will be understood that the cap for the filler opening of the vessel will be then not vented.

Reference being had to the figures, there will be seen a vent plug 1 of a generally cylindrical form. This plug comprises a frame structure 2 made for example of hard rubber and provided with a reduced diameter lower end portion 3. This lower end portion is exteriorly threaded to engage the threaded filler opening 4 of a cover plate 5 for a storage battery cell 6. The frame structure 2 has a lower cavity 7 in its end portion 3, a short axial opening 8 of restricted diameter leading up from the cavity 7 and a then larger diameter axial opening 9 leading from the restricted opening 8 through the top of the plug. Also, leading from the restricted opening 8 through the side walls of the frame structure are vent openings 10. The vent passageway of the plug—which is by way of the cavity 7, opening 8 and vents 10—is closable by a valve 11 having a flared lower head 11' adapted to seat against the lower edge of the opening 8. This valve extends loosely through the opening 8 and threads into a magnetic plunger 12 in the opening 9 abovementioned. Under the influence of the weight of the plunger, the valve 11 is normally held in open position.

For operating the valve 11 to closed position there is provided an electromagnetic means the armature of which is the plunger 12 just mentioned, it being for this reason that the plunger is made of a magnetic material such as of iron. The plunger is attracted axially upwardly in relation to the plug by a coil 13 which is disposed within a peripheral recess 14 of the frame structure 2. Threaded into the axial opening 9 above the plunger 12 is a core 15. This core is preferably made also of a magnetic material, such as of iron, so as to render the electromagnetic means more efficient for actuating the valve 11. In the present invention, this core 15 is also utilized as one contact element of a control switch 16 for the vent plug, as is now explained.

The core 15 terminates within the axial opening 9 and has at its top a concave conical surface 15'. Threaded into the opening 9 above the core 15 is a cap or second contact element 17 of conductive material. This cap 17 has a lower convex conical surface 17' facing the surface 16' but spaced therefrom so as not to make electric contact directly therewith. The vertex angle of the upper conical surface 17' is however made greater than that of the lower surface 16' so that these two surfaces will have their minimum spacing at their outer edges. In the space 18 between these surfaces there is provided a globule of mercury 19. This globule is sufficiently small so that it will not bridge the two surfaces 15' and 17' when the globule rests at the vertex of the lower surface, which is the condition obtained when the vent plug is at a normal or upright position. When the vent plug is tilted in any direction by as much as the angle of inclination of the lower conical surface with the horizontal— herein termed the critical tilt angle—the globule of mercury will roll from that vertex toward the place of minimum spacing between the upper and lower surfaces 15' and 17', and will bridge these surfaces to electrically connect the core 15 to the cap 17. As a typical case, the lower conical surface may subtend an angle of 20° with a plane normal to the axis of the plug and the upper conical surface may subtend an angle of 15° with such a plane. For this condition the switch 16 will then close when the plug is tilted by just more than 20° from an upright position. Of course, if desired, the vertex angle of the lower conical surface may be increased so that the switch 16 will close at a smaller angle of tilt of the plug.

The coil 13 is connected serially with the switch 16. This is done for example by connecting the coil at 20 to the core 15 and providing a lead 21 for connection to the cap 17. This lead 21 and the other lead 22 of the coil are then connected to a suitable source of potential as is shown in Figure 4. In the case where the non-spill vent plug is for a storage battery, as is herein illustrated in Figures 1 and 3, these leads will be preferably connected to the battery itself as is shown.

I have found the vent plug construction hereinabove described to have a very positive and reliable operation. This improved operation arises from the fact that the vent valve may be closed electromagnetically with a very strong force, while with the use of a plug of only medium over-all size. With a plug substantially less than two inches in over-all height, there may be efficiently obtained a magnetic pull on the valve sufficient to positively hold it closed under conditions of heavy vibration of the plug in directions axial thereto—i. e., under conditions more severe than the plug would be subjected to in aircraft or other applications. Of course, such maintenance of the valve in closed position presupposes a substantially continuous energization of the coil or, in other words, a substantially continuous closure of the switch 16. It is a feature, however, of the mercury switch which I provide that it will maintain itself closed substantially continuously under a condition of heavy axial vibration of the plug. It is a further feature of this switch 16 that it will remain closed for all angles of tilt of the plug beyond the critical tilt angle aforementioned, including an angle of inversion for when the plug is inverted the switch is maintained closed by reason of the conical surface 17' of the switch being convex. Thus, with the present non-spill vent device there is positive assurance against any leakage from the cell to which the device is applied for all conditions of tilting, inversion or vibration of that cell. Yet, when the cell is returned to an upright position, the switch 16 will open and the vent valve will be restored positively to open position by the weight of the plunger 12.

Each of the metallic elements of the vent plug is suitably protected from acid corrosion. To this end, the valve 11 and cap 17 may be made wholly of lead, and the magnetic plunger 12 and core 15 may be lead coated. The coil 13 is also protected from acid corrosion by a tubular sheath 23, such as of hard rubber, which is placed over the coil and sealed at its ends, as at 24, to the frame structure 2. In addition, the leads 21 and 22 may likewise be made of lead.

The embodiment of my invention herein shown and described will be understood to be illustrative and not limitative of my invention for the same is subject to many changes and modifications within the range of engineering skill without departure from the scope of my invention, which I endeavor to express according to the following claims.

I claim:

1. In a non-spill vent device for a storage battery comprising a structure adapted for engagement with the filler opening of the battery and having a vent opening therethrough the combination of a valve for said vent opening, a magnetic plunger connected to said valve and biasing the valve to open position when said device is in vertical position, a coil mounted on said structure for actuating said plunger to close said valve, and a normally open switch on said structure in serial arrangement with said coil, said switch being at least partially within said coil and including relatively movable inertia means responsive upon angular tilting of the vent device by a minor fraction of a right angle from vertical position for rendering the switch closed.

2. In a non-spill vent plug for a storage battery including a structure for engagement with the filler opening of the battery, said structure having a vent opening therethrough and a valve to close said vent opening: the combination of electromagnetic means on said structure energizable to operate said valve, and a switch mounted on said structure for controlling said electromagnetic means comprising a chamber having spaced apart upper and lower conical surfaces of conducting material, said upper and lower surfaces being respectively convex and concave as viewed from said chamber and the vertex angle of the upper conical surface being greater than that of the lower whereby said surfaces will have a minimum separation at the side wall of the chamber, and a globule of mercury in said chamber of a quantity sufficient to bridge said upper and lower surfaces when the plug is tilted from an upright position to cause the globule of mercury to flow from the vertex of said lower surface.

3. A non-spill vent plug for a storage battery comprising a housing having an opening terminating in a restricted vent opening at the bottom; a valve associated with said restricted opening for closing the vent passageway of the plug; a movable magnetic plunger in said axial opening and connected to said valve; a rigidly held conductive core in said axial opening and spaced axially above said plunger; a conductive closure member in the outer end portion of said axial opening and spaced adjustably from said core; a movable conducting element in the space between said core and closure member adapted to form a switch, with said core and closure member, which is responsive to angular positioning; and a peripheral coil on said structure controlled by said switch for actuating said plunger.

4. In a non-spill vent device for a storage battery, comprising a structure for closing the battery cell at the top, said structure having a vent opening leading therethrough and a valve to close said vent opening: the combination of electromagnetic means on said structure energizable to operate said valve, and a switch mounted on said structure for controlling said electromagnetic means comprising a chamber having upper and lower surfaces of conducting material, said lower surface being substantially conical and concave as viewed from said chamber and having a minimum separation from said upper surface at the side wall of the chamber; and a globule of mercury in said chamber for interconnecting said surfaces when said vent device is tilted from an upright position.

5. In a non-spill vent plug for a storage battery comprising a housing having a vent at the bottom leading into an enlarged opening thereabove, and a valve for said vent; the combination of a movable magnetic plunger in said opening and connected to said valve; a coil associated with said plunger for actuating the plunger to operate said valve; and a switch in said housing for controlling the supply of current to said coil, comprising a conductive switch member spaced axially above said plunger and a movable element in close proximity with said switch member and responsive to angular tilting of said plug for contacting the switch member to close said switch.

ALBERT B. VIETH.